(12) United States Patent
Terashima et al.

(10) Patent No.: US 7,345,829 B2
(45) Date of Patent: Mar. 18, 2008

(54) OBJECTIVE LENS

(75) Inventors: Yasutaka Terashima, Takamori-machi (JP); Yasuhiro Yoneda, Iida (JP); Teruo Yamashita, Akishima (JP); Hideaki Koyanagi, Iida (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/787,068

(22) Filed: Apr. 13, 2007

(65) Prior Publication Data

US 2007/0253073 A1    Nov. 1, 2007

Related U.S. Application Data

(63) Continuation of application No. 10/823,000, filed on Apr. 13, 2004, now Pat. No. 7,212,485.

(30) Foreign Application Priority Data

Apr. 14, 2003    (JP) .............................. 2003-109454

(51) Int. Cl.
  *G02B 3/02* (2006.01)
  *G11B 7/02* (2006.01)
(52) U.S. Cl. ................. 359/719; 359/708; 359/720; 369/112.01
(58) Field of Classification Search ................ 359/642, 359/708, 718, 719, 720; 369/112.01, 112.23
See application file for complete search history.

(56) References Cited

U.S. PATENT DOCUMENTS

| 6,781,764 | B1 * | 8/2004 | Takeuchi et al. ............. 359/629 |
| 6,785,215 | B2 * | 8/2004 | Yamanouchi et al. .. 369/112.23 |
| 6,822,800 | B2 * | 11/2004 | Koreeda et al. ............. 359/634 |
| 7,253,968 | B2 * | 8/2007 | Kimura et al. .............. 359/719 |
| 2003/0035225 | A1 * | 2/2003 | Kim et al. .................. 359/719 |

* cited by examiner

*Primary Examiner*—Scott J. Sugarman
*Assistant Examiner*—Darryl J. Collins
(74) *Attorney, Agent, or Firm*—Jordan and Hamburg LLP

(57) ABSTRACT

Lens aberration in an objective lens for recording and reproducing optical information, which is composed of a molded aspherical single lens, is inhibited while at the same time good lens productivity is attained. Also attained are excellent optical properties and high production efficiency in a mold processing step and a press molding step conducted to manufacture the lens. To this end there is provided an objective lens 1 having a convex aspherical surface formed at a first surface and a numerical aperture NA which satisfies the condition $NA \geq 0.8$. It is preferable to have an aspherical surface also at the second surface. A molding material that was premolded to a prescribed shape and is in a heated and softened state is press molded by using a pair of upper and lower molds having opposing molding surfaces, a molding surface shape is transferred by using a spherical molding material with a radius r and pressing the molding material between a pair of upper and lower molds, and the paraxial curvature radius R of the convex aspherical surface satisfies the following relation $r/R \leq 1.35$.

7 Claims, 12 Drawing Sheets

SPHERICAL ABERRATION (mm)   ASTIGMATISM (mm)

× SAGITTAL DIRECTION
+ TANGENTIAL DIRECTION

PREFORM RADIUS R/LENS CURVATURE RADIUS R

OBJECTIVE LENS

This is a Continuation application Ser. No. 10/823,000 filed Apr. 13, 2004, now U.S. Pat. No. 7,212,485 now Allowed.

BACKGROUND OF THE INVENTION

The present invention relates to an objective lens used for at least recording or reproducing high-density optical recording medium such as the so-called optical disks. In particular, the present invention relates to an objective lens for recording and reproducing high-density optical information using a short wavelength light source and manufacturing method therefor.

CD (compact disks) that have been widely used as optical recording medium are employed mainly in a numerical aperture range of 0.45-0.5. Furthermore, DVD (digital versatile disks) conduct optical information recording in a numerical aperture (NA) range of 0.6-0.65 by using a light source with a wavelength of 650-780 nm.

However, as a need for increased capacity has been generated, a demand arose for high-density optical information recording medium capable of recording with a higher recording density and optical systems for such recording and reproduction. Accordingly a demand for higher NA was created in the field of objective lenses used for such applications, that is, in the optical systems for recording and reproducing with such high-density optical information recording media.

Laid open Japanese Patent Application No. 2001-324673 describes an objective lens for use in optical systems for recording and reproducing high-density optical information recording media, this lens being advantageously suitable for high-density recording and reproduction devices with a numerical aperture NA of 0.75 or larger and a light source wavelength of about 400 nm.

Further, this prior art document describes an aspherical single-lens objective lens with an axial length thickness d1 and a focal distance f satisfying the following condition $$1.1 \leq d1/f \leq 3,$$

or a lens in which an Abbe number vd, refractive index n at a usage wavelength, and a paraxial curvature radius r1 at the light source side satisfy the following conditions:

| | |
|---|---|
| $1.2 \leq d1/f \leq 2.3$ | $f/vd \leq 0.060$ |
| $1.40 \leq n$ | |
| $1.40 \leq n < 1.85$ | $0.40 \leq r1/(n \times f) \leq 0.70.$ |

Further, Laid-open Japanese Patent Application No. 2002-156579 suggested a biaspherical lens with a numerical aperture NA of 0.7 or more and a central thickness of the lens larger than the focal distance as an objective lens suitable for such transition to increased density.

In large-capacity optical disks of the next generation, a wavelength close to 400 nm which is shorter than that of the conventional technology has to be used as a light source wavelength for increasing the recording density. In this case, for example, a blue-violet semiconductor laser is needed as a light source and an aspherical lens with a numerical aperture NA of 0.8 or larger is required as an objective lens.

In single-lens objective lenses for optical disks, a certain correlation exists between the off-axis aberration, eccentricity tolerance, or chromatic aberration and the lens thickness.

In the conventional objective lenses for CD or DVD, the range of lens thickness which is allowed by the required aberration is comparatively wide owing to the range of values of the numerical aperture NA thereof. This is why it was possible to conduct lens design and determine lens thickness based exclusively on physical limitations such as working distance and lens weight. However, in single-lens objective lenses for large-capacity optical disks, the aberration tends to increase due to higher NA. A range of lens thickness that can be selected to obtain sufficient optical performance, that is, to reduce the aberration to below the prescribed range, is limited. As a result, in single-lens objective lenses for higher NA, the effective lens thickness becomes larger with respect to a focal distance than that of the objective lenses for conventional CD or DVD.

If the lens thickness thus increases, the volume of the lens material increases accordingly. Thus, the radius r of the premolded optical material which is used as the lens material, for example, the radius of a spherical preform, becomes larger. The resultant problem is that if the radius r exceeds the paraxial curvature radius R (almost equal to paraxial curvature radius R of the lens that will be molded) of the molding surface in the mold, the desired lens surface accuracy is difficult to obtain.

For example, with such lenses, if the curvature radius R of the molding surface of the mold is less than the curvature radius r of the molding material that was premolded prior to molding, that is, the preform (for example, a glass preform composed of glass), when a lens having a convex surface is molded by a mold press molding process, then a preform with a curvature radius larger than that of the concave molding surface of the mold will be disposed at this molding surface during press molding.

If press molding is to be conducted in this state, then an atmosphere gas such as air or the prescribed gas will be confined between the molding surface and the preform. If molding is then conducted without releasing this gas, the described lens surface accuracy will not be attained. For example, a recess will be formed in the molded lens.

With the foregoing in view, it is an object of the present invention to provide an objective lens which makes it possible to inhibit the aberration in an objective lens for optical information recording and reproduction, which is composed of a molded aspherical single lens, while attaining at the same time good lens productivity, and also to ensure excellent optical properties and to obtain a high production efficiency in a mold processing step conducted to process the molding surface of the mold and in press molding of a lens manufacture step, and also to provide a method for the manufacture of such a lens.

Thus, it is an object of the present invention to provide a method for the manufacture of an objective lens by which, in particular, molding is effectively prevented from being conducted in a state in which a gas is confined between the preform and the mold and a lens with a high surface accuracy can be molded.

Further, it is an object of the present invention to provide a method for the manufacture of an objective lens by which, in particular, productivity can be further increased and the off-axis aberration and chromatic aberration can be further improved.

It is another object of the present invention to provide a method for the manufacture of an objective lens which is advantageously suitable in particular for a lens of an infinite system with respect to at least a standard wavelength.

It is another object of the present invention to provide a method for the manufacture of an objective lens by which, in particular, a working distance is ensured, and the off-axis view angle aberration, chromatic aberration, and also the increase in the lens weight can be effectively inhibited.

It is another object of the present invention to provide a method for the manufacture of an objective lens by which, in particular, the process of assembling an optical pickup using such a lens can be further facilitated.

It is object of the present invention to provide a method for the manufacture of an objective lens by which, in particular, a high refractive power can be obtained without drastically increasing the curvature of the lens curved surface, precision processing of the molding surface of the mold can be conducted comparatively easily, the chromatic aberration can be effectively reduced, and a mold material can be easily selected.

It is another object of the present invention to provide a lens with a high surface accuracy, such that molding is effectively prevented from being conducted in a state in which a gas is confined between the preform and the mold.

SUMMARY OF THE INVENTION

A method for the manufacture of an objective lens of the present invention is a method for the manufacture of an objective lens for recording and reproducing optical information comprising a step of press molding a molding material that was preformed to a prescribed shape and is in a heated and softened state by using a pair of upper and lower molds having opposing molding surfaces, wherein the objective lens is a lens which has a convex aspherical surface at the first surface and a numerical aperture NA satisfying the condition NA≧0.8, the method comprises a step of transferring a molding surface shape by using a molding material of shape of sphere with a radius r and pressing the molding material between a pair of upper and lower molds, and the paraxial curvature radius R of the convex aspherical surface satisfies the following relation: r/R≦1.35.

With such features, it is possible to inhibit the lens aberration in an objective lens for recording and reproducing optical information, which is composed of a molded aspherical single lens, while attaining at the same time good lens productivity, and also to ensure excellent optical properties and to obtain a high production efficiency in a mold processing step conducted to process the molding surface of the mold and in a press molding step conducted to manufacture the lens. In particular, the molding process can be effectively prevented from being conducted in a state in which a gas is confined between the preform and the mold and a lens with a high surface accuracy can be molded.

Here, recording and reproduction of optical information means utilization for at least any one of recording and reproduction.

Further, the term "mold" includes molds composed of metals, cemented carbide, ceramics, and the like, and no limitation is placed on the material thereof.

According to another aspect of the manufacturing method of the present invention, the spherical material radius r and the paraxial curvature radius R of the convex aspherical surface in the manufacturing method of claim 1 satisfy the following relation: 1.0≦r/R≦1.3.

With such a feature, in particular, productivity can be further increased and the off-axis aberration and chromatic aberration can be further improved.

Thus, sufficient optical performance can be achieved at a good yield, without overextending the molding cycle time during mass production.

According to another aspect of the manufacturing method of the present invention the optical magnification of the objective lens with respect to a standard wavelength is zero.

With such a feature, in particular, the objective lens is advantageously suitable as a lens of an infinite system with respect to at least a standard wavelength.

According to another aspect of the manufacturing method of the present invention, the focal distance, f (mm), of the objective lens satisfies the following relation:

$$0.5 \leq f \leq 2.1.$$

With such a feature, in particular, a working distance is ensured, and the off-axis view angle aberration, chromatic aberration, and increase in the lens weight can be effectively inhibited.

According to another aspect of the manufacturing method of the present invention, the axial wavefront aberration of the objective lens at a standard wavelength λ is 0.04 λrms or less.

With such a feature, in particular, the process of assembling an optical pickup using such a lens can be further facilitated.

According to another aspect of the manufacturing method of the present invention, the objective lens is composed of an optical glass which has a refractive index n of 1.65 or more, an Abbe number νd or 40 or more, and a yield temperature Ts of 650° or less.

With such a feature, in particular, a high refractive power can be obtained without drastically increasing the curvature of the lens curved surface, precision processing of the molding surface of the mold can be conducted comparatively easily, the chromatic aberration can be effectively reduced, and a mold material can be easily selected.

The objective lens in accordance with the present invention is an objective lens for recording and reproducing optical information which has a convex aspherical surface at the first surface and a numerical aperture NA satisfying the condition NA≧0.8, this lens being a mold pressed lens in which the relationship 1.0≦r/R≦1.35 is valid between a paraxial curvature radius R of the convex aspherical surface and r satisfying the following formula $(4/3)\pi r^3 = V$ where V stands for a volume of the objective lens.

With such a feature, it is possible to inhibit the lens aberration in an objective lens for recording and reproducing optical information which is composed of a molded aspherical single lens, while attaining at the same time good lens productivity, and also to ensure excellent optical properties and to obtain a high production efficiency in mold processing and press molding conducted when the lens is manufactured. In particular, the molding process can be effectively prevented from being conducted in a state in which a gas is confined between the preform and the mold, and a lens with a high surface accuracy can be manufactured.

Figure 1:
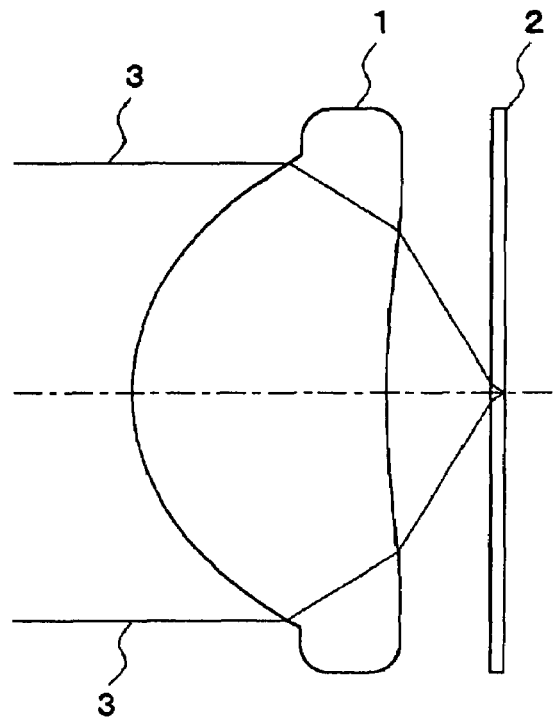
FIG. 1 is structural drawing illustrating schematically the configuration of an objective lens optical system for recording and reproducing optical information of the working example of the present invention.

In the drawings, the references designation have the following meanings:

| | |
|---|---|
| 1 | objective lens |
| 2 | cover glass (CG) |
| 3 | luminous flux |
| PF | preform |
| $R_C$ | radius of the corner of the objective lens |
| $R_O$ | radius of outer diameter |
| $R_E$ | radius of effective diameter of the first surface |
| r | radius of preform (spherical material) |

DETAILED DESCRIPTION

The objective lens in accordance with the present invention and a method for the manufacture thereof will be explained below in greater detail with reference to the appended drawings based on the preferred embodiments of the present invention.

Figure 2:
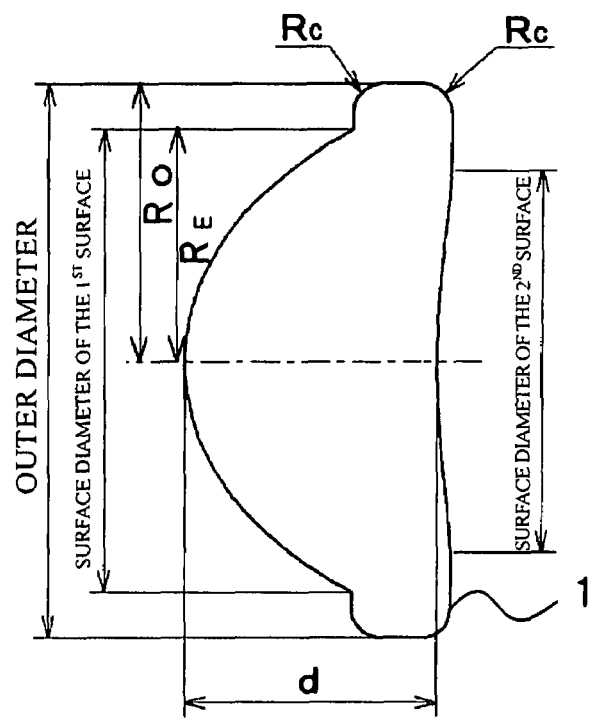
FIG. 2 is a cross-sectional view for explaining in greater detail the shape of the objective lens shown in FIG. 1.
Figure 3:
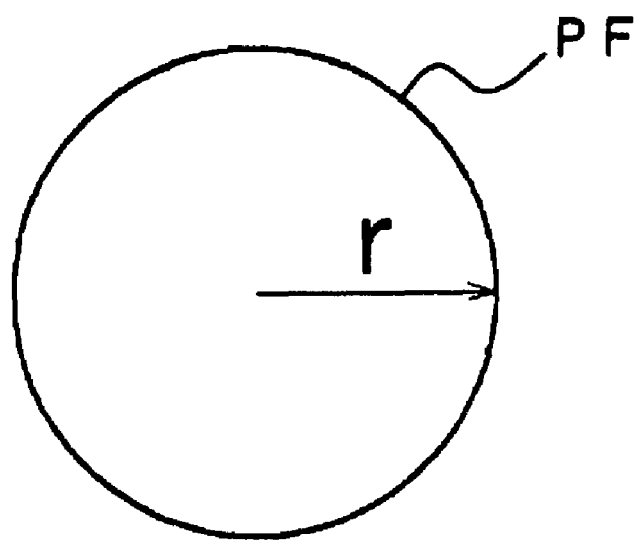
FIG. 3 is a drawing illustrating schematically the shape of a glass preform as a molding material for molding the objective lens shown in FIG. 1.

FIGS. 1 to 3 illustrate the configuration of the objective lens for recording and reproducing optical information of the preferred embodiment of the present invention. FIG. 1 is a structural view illustrating schematically the configuration of the objective lens optical system for recording and reproducing optical information. FIG. 2 is a cross-sectional view for explaining in detail the shape of the objective lens shown in FIG. 1. FIG. 3 illustrates schematically the shape of the molding material, that is, the preform for molding the objective lens shown in FIG. 1.

The objective lens optical system shown in FIG. 1 comprises an objective lens 1 and a cover glass (CG) 2. The objective lens 1 shown herein has a lens shape corresponding to the below-described first working example. A luminous flux 3 falling on the objective lens 1 is also shown in FIG. 1. The cover glass 2 is a protective layer, that is, a cover glass, for protecting the surface of the optical information recording medium such as an optical disk.

The objective lens for recording and reproducing optical information of one embodiment of the present invention is a lens in which a convex aspherical surface is formed at the first surface and has a numerical aperture NA satisfying the condition $NA \geq 0.8$.

It is preferred that an aspherical surface be also formed at the second surface, but the second surface may be either a convex aspherical surface or a concave aspherical surface.

Further, when molding is conducted by using a spherical preform PF, if the radius r thereof satisfies the following relationship with a paraxial curvature radius R of the convex aspherical surface $r/R \leq 1.35$, then the molding process can be prevented from being conducted with air being confined between the preform PF and a mold, and a lens with a high surface accuracy can be molded.

Furthermore, making this radius ratio r/R of 1.3 or less further increases the production performance. It is also preferred that the radius ratio r/R be 1.0 or more, because the off-axis aberration and chromatic aberration can be further improved. It is even more preferred that this ratio be 1.2 or less and 1.0 or more.

It is preferred that the objective lens in accordance with the present invention have a zero optical magnification and be used as an infinite system lens. However, according to the optical system used, it may be also employed as a finite system lens for creating a diverging incident light. In particular, when an objective lens of a single optical system is used to conduct recording and reproduction with a plurality of wavelengths, the lens can be also used in an infinite system at one wavelength and in a finite system at the other wavelength.

Further, if a focal distance is denoted by f, then it is preferred that the following condition be met 0.5 (mm)≦f to ensure the working distance. Further, if f>2.1 (mm), then the off-axis angle-of-view aberration and chromatic aberration increases and the lens weight also increases. Therefore, it is preferred that f≦2.1 (mm). It is more preferred that f≦1.8 (mm) and it is even more preferred that f≦1.2 (mm).

In the objective lens 1 in accordance with the present invention, the off-axis wavefront aberration relating to an angle of view of 0.5° at a standard wavelength λ is preferably 0.15 γrms or less, more preferably 0.07 γrms or less, and even more preferably 0.05 γrms or less. In such a case, the optical pickup unit can be easily assembled. Furthermore, the axial wavefront aberration is preferably designed to assume a numerical value close to zero, for example, 0.01 λrms or less, and the actual value in the molded lens is preferably 0.04 λrms or less.

Furthermore, the chromatic aberration is preferably 0.6 μm/nm or less. Here, the standard wavelength λ is a wavelength used by the optical pickup employing the objective lens 1 in accordance with the present invention and can be selected, for example, as a prescribed wavelength of 450 nm or less. As a specific example, it can be 400-450 nm. For example, a blue-violet semiconductor laser with a wavelength of 407.50 nm can be employed.

In the objective lens 1 in accordance with the present invention, the following relationship is preferably satisfied between a radius $R_O$ (mm) of the outer diameter shown in FIG. 2 and a radius $R_E$ (mm) of the effective surface diameter (equal to a diameter of luminous flux 3 shown in FIG. 1) of the first surface:

$$0.2 \leq (R_O - R_E) \leq 0.6.$$

This is because when a flat portion such as a lens mounting portion (flange portion) is provided in the portion on the outer side of the optical effective diameter of the lens, if the surface area of this portion is too larger, the volume of the molding material used for molding becomes large, easily raising the above-described problem of surface accuracy degradation.

The volume of the objective lens 1 in accordance with the present invention is preferably 0.3-25 mm³, more preferably 0.5-15 mm³. Within this range, no excess load is used for driving the objective lens, normal operation can be maintained, and a highly accurate lens can be molded by the manufacturing method in accordance with the present invention.

The objective lens 1 in accordance with the present invention is molded from an optical material such as glass or resin, and the optical material which is to be used is preferably a sphere-shaped glass perform PF which was preformed in advance, for example, to the prescribed shape and weight. As for the optical characteristics of the preform PF which is to be used, in this case the refractive index n at a standard wavelength λ is 1.65 or more, preferably 1.7 or more. Selecting such a refractive index makes it possible to obtain a high refractive power, without greatly increasing the curvature of the lens curved surface. Therefore, when the molding surface of the mold is shaped by precision machining such as grinding and polishing, processing is comparatively simple and effective. The Abbe number vd is preferably 40 or higher. From the standpoint of reducing the chromic aberration of the lens, a value of 50 or more is even more preferred. Furthermore, it is preferred that an optical glass with a specific gravity of 2.20-4.70 g/cm³ be used for the objective lens 1 in accordance with the present invention. This is because decreasing the specific gravity makes it possible to reduce the drive power of the optical pickup. Furthermore, if the yield temperature Ts of the glass is too high, molding temperature increases, precision mirror processing can be conducted and a mold material with a sufficient rigidity is difficult to select. Therefore, it is preferred that the yield temperature Ts be 650° C. or less. Furthermore, if the liquidus temperature LT of the glass is within an adequate range, a spherical glass preform of the desired volume can be prepared by forming in hot state. Therefore, it is preferred that the liquidus temperature be less than 1000° C. Further, the glass preform may be also processed in a cold state, but if hot forming is carried out, the production process can be advantageously shortened. This is because hot forming is a method for forming the perform by dripping a molten glass or causing it to flow down, whereas cold processing is a method of forming by grinding the cut glass.

Examples of optical glass materials that are especially preferred as materials for the objective lens 1 in accordance with the present invention are presented below.

Thus, an optical glass is preferred which comprises diboron trioxide, that is, $B_2O_3$, lanthanum oxide, that is, $La_2O_3$, yttrium oxide, that is, $Y_2O_3$, silicon dioxide, that is, $SiO_2$, lithium oxide, that is, $Li_2O$, calcium oxide, that is, CaO, and zinc oxide, that is, ZnO as the necessary components and has a refractive index nd of 1.675 or more, an Abbe number vd of 50 or more, and a yield temperature Ts of 650° C. or less. The optical constants have the above-described advantages. In addition such a glass is suitable to mold pressing because of a low yield temperature Ts. One more advantage is that such glass with a specific gravity of 3.55 g/cm³ or less is a lightweight material.

Further, the aforementioned optical glass may be a glass containing as glass components, in percent by weight, 25-42% of $B_2O_3$, 14-30% of $La_2O_3$, 2-13% of $Y_2O_3$, 2-20% of $SiO_2$, more than 2% and 9% or less of $Li_2O$, 0.5-20% of CaO, 2-20% of ZnO, 0-8% of $Gd_2O_3$ (gadolinium oxide), and 0-8% of $ZrO_2$ (zirconium oxide), with $Gd_2O_3+ZrO_2$ being 0.5-12% and the aforementioned components having a combined content ratio of 90% or more, and also optionally 0-5% of $Na_2O$ (sodium oxide), 0-5% of $K_2O$ (potassium oxide), 0-5% of MgO (magnesium oxide), 0-5% of SrO (strontium oxide), 0-10% of BaO (barium oxide), 0-5% of $Ta_2O_5$ (tantalum oxide), 0-5% of $Al_2O_3$ (aluminum oxide), 0-5% of $Yb_2O_3$ (ytterbium oxide), 0-5% $Nb_2O_5$ (niobium oxide), 0-2% of $As_2O_3$ (diarsenic trioxide), and 0-2% of $Sb_2O_3$ (diantimony trioxide).

Here, boron oxide (diboron trioxide) plays a role of glass forming component, and if the content of boron oxide is less than 25 wt. %, resistance of the glass to devitrification easily degrades. If this content is more than 42 wt. %, optical glass with a high refractive index is difficult to obtain. Furthermore, lanthanum oxide and yttrium oxide are effective components for obtaining an optical glass with a high refractive index and low dispersion. Silicon oxide (silicon dioxide) is a component demonstrating the effect of increasing the resistance of glass to devitrification when it is added in an appropriate amount to a glass of a $B_2O_3$—$La_2O_3$ system. Lithium oxide is effective as a component reducing the yield temperature Ts of the glass. Calcium oxide is a component demonstrating the effect of increasing the resistance of glass to devitrification, while maintaining a high refractive index characteristic and low-dispersion characteristic of a glass of a $B_2O_3$—$La_2O_3$ system. Zinc oxide, similarly to calcium oxide, is a component demonstrating the effect of increasing the resistance of glass to devitrification, while maintaining a high refractive index characteristic and low-dispersion characteristic of a glass of a $B_2O_3$—$La_2O_3$ system. In addition it also decreases the yield temperature Ts. Further, cadmium oxide and zirconium oxide are the components increasing the resistance of glass to devitrification when they are added in appropriate amounts.

Combining those components within the above-described ranges of content ratios and optically introducing other components (optical components) makes it possible to obtain easily an optical glass with the following physical properties: refractive index n of 1.675 or higher, Abbe number vd of 50 or higher, yield temperature Ts of 650° C. or less, and liquidus temperature LT of 1000° C. or less.

Another preferred optical glass comprises $B_2O_3$, $SiO_2$, $La_2O_3$, $Gd_2O_3$, ZnO, $Li_2O$, and $ZrO_2$ as the necessary components and has a refractive index nd of 1.75-1.85 and an Abbe number vd of 40-55. Such a glass with a specific gravity of 4.70 g/cm$^3$ or less is preferred. The aforementioned optical glass may be a glass containing as glass components, 25-45 mol % of $B_2O_3$, 2-20 mol % of $SiO_2$, 5-22 mol % of $La_2O_3$, 2-20 mol % of $Gd_2O_3$, 15-29 mol. % of ZnO, 1-10 mol % of $Li_2O$, and 0.5-8 mol % of $ZrO_2$, with the molar ratio of $B_2O_3/SiO_2$ being 2-5.5, the total content of $La_2O_3$ and $Gd_2O_3$ being 12-24 mol %, and the total content of ZnO and $Li_2O$ being 25-30 mol %. In this case, too, the role of each component is identical to that in the above-described glass.

Yet another preferred optical glass comprises $SiO_2$, $B_2O_3$, $Li_2O$, ZnO, $LaO_3$, $ZrO_2$ $Nb_2O_5$, and $Ta_2O_5$ and has a refractive index nd of 1.75-1.85 and an Abbe number vd of 40-48. Such a glass with a specific gravity of 4.60 g/cm$^3$ or less is preferred. Here $Nb_2O_5$ and $Ta_2O_5$ are effective as components for obtaining a high refractive index.

A method for the manufacture of the objective lens for recording and reproducing optical information relating to the embodiment of the present invention will be described below.

The method for the manufacture of the objective lens for recording and reproducing optical information relating to the embodiment of the present invention is a method for the manufacture of an objective lens for recording and reproducing optical information comprising press molding a molding material that was preformed to a prescribed shape and is in a heated and softened state by using a pair of upper and lower molds having opposing molding surfaces. The objective lens is a lens which has a convex aspherical surface at the first surface and a numerical aperture NA satisfying the condition NA$\geq$0.8.

The method comprises a step of transferring a molding surface shape by using a spherical molding material with a radius r and pressing the molding material between a pair of upper and lower molds, and the paraxial curvature radius R of the convex aspherical surface satisfies the following relation: $r/R \leq 1.35$.

Features described hereinabove in relation to the objective lens in accordance with the present invention are similarly valid for the objective lens manufactured by the manufacturing method in accordance with the present invention.

Molding of a glass lens with a molding press is conducted in the manner as follows.

A preform which is a sphere-shaped glass material is placed on a lower mold, and the upper mold and lower mold are heated with heating means.

After the upper mold and lower mold have been heated to the prescribed temperature, the upper mold and lower mold are brought close to each other by raising the lower main shaft at a prescribed rate with driving means and a pressure is applied to the perform by bringing the molds into intimate contact with each other.

The upper mold and lower mold have molding surfaces on the opposing surfaces thereof, and the molding surfaces have been subjected to precision shape processing based on the desired lens shape.

The rate at which the lower mold is moved (this rate is called a pressing rate) should not be too high at least at an initial state at which the upper and lower molds are brought into contact with the perform and the perform is deformed, in order to prevent the gas from being confined between the perform and the molding surfaces.

For example, if the r/R value exceeds 1, a space is formed between the perform and the molding surface when the perform and the molding surface of the mold are brought into contact. If the maximum height of the space is denoted by h, then the pressing rate in the process of the upper and lower mold approaching each other through the distance equivalent to h (during pressing initiation interval in which the lower mold moves through the distance h after it started moving) is preferably not excessively high.

The pressing rate at this time can be, for example 1 mm/sec or less. Further, when the lower mold reaches the prescribed position, preferably, after the lower mold moved through the distance h, the pressing rate may be changed. It goes without saying, that the lower mold maybe fixed and the main shaft of the upper mold may be lowered at the prescribed rate.

The pressing rate in the pressing initiation period will be described below.

The glass temperature during pressing, as represented by glass viscosity, may be equivalent of $10^{6.5}$-$10^{8.5}$ poise, at least at the glass surface. However, it is preferably equivalent to $10^7$-$10^8$ poise. The same is true for the mold temperature.

Cooling of the upper mold and lower mold is started after the preform is pressed. The cooling is carried out by using gas blower or terminating power supply to a heater. The cooling rate may be 30-100° C./min. After the temperature decreased to Tg or less, the press pressure is released and then cooling is conducted to a temperature at which removal is possible, the molds are separated, and the lens is removed. In a continuous molding process, the lenses can be mass produced by repeating the above-described operations.

Surface accuracy defects such as recesses in the molded lens occur when molding in the above-described process is conducted without releasing the gas confined between the molding surface and the perform during pressing. The inventors have investigated the conditions under which the glass is deformed while the confined air is released during pressing, that is, the press mold pressing in which such defects to not occur.

Figure 24:
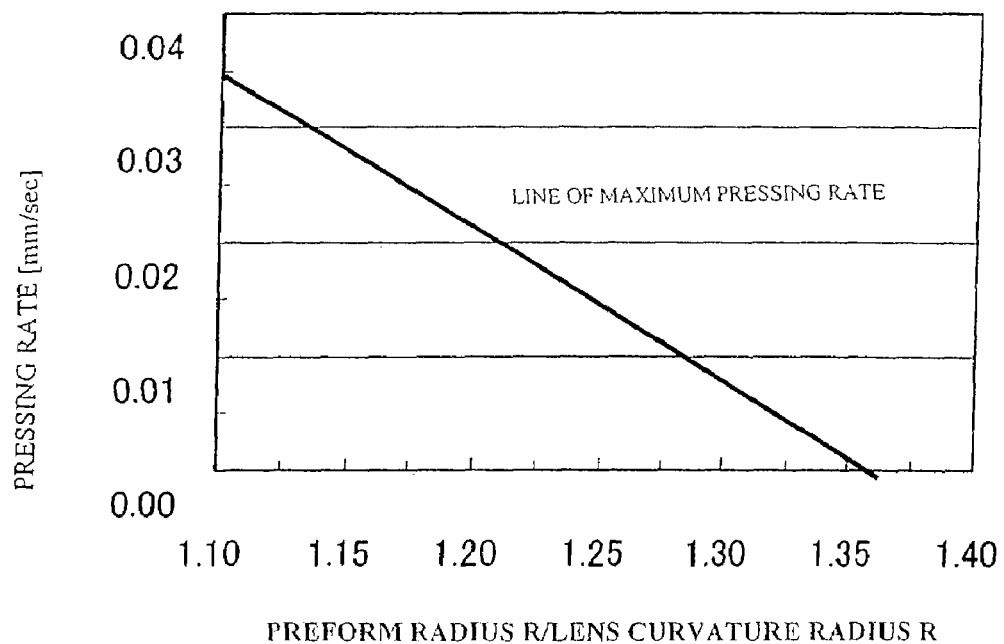
FIG. 24 illustrates the correlation between the pressing rate and r/R.

A maximum value of pressing rate in the pressing initiation period at which the confined air can be released was found and plotted. The extrapolated plot is shown in FIG. 24. The r/R ratio in the point where the pressing rate becomes zero was about 1.36.

Therefore, it was found that when the r/R became above 1.36, the pressing rate had to be zeroed or made extremely small, and if r/R is 1.35 or less, a lens with a sufficient surface accuracy can be manufactured.

The perform used herein was optical glass A (contains $B_2O_3$, $SiO_2$, $La_2O_3$, $Gd_2O_3$, ZnO, $Li_2O$, $ZrO_2$, refractive index nd 1.773 and vd 47.3, Ts 615° C.).

The following conditions were employed in press molding.

Press temperature 632-645° C.

Pressing pressure 500-600 N.

Pressing atmosphere Nitrogen atmosphere, 1.01-1.5×105 Pa.

The above-described results were also confirmed to be the same for another optical glass (for example, optical glass B: contains $B_2O_3$, $SiO_2$, $La_2O_3$, ZnO, $Li_2O$, $ZrO_2$, $Nb_2O_5$, and $Ta_2O_5$, refractive index nd 1.804 and vd 40.8, Ts 600° C.).

In order to shorten the molding cycle time and to obtain lenses with good productivity, the r/R ratio is preferably 1.3 or less.

In the above-described process, a highly accurate lens can be also manufactured when a closed space appears between the preform and molding surfaces, as described hereinabove, due to a relation between the radius r of the preform and radius R of the molding surface. For example, gas can be prevented from remaining in the closed space by reducing the pressure inside the press chamber to about 10 Torr or less.

However, the confined atmosphere gas can be adequately released in the course of pressing operation and an optical element with excellent shape can be molded even without evacuating the press chamber, in other words, in an operation environment under atmospheric pressure, by selecting temperature conditions or pressing rate during pressing.

Therefore, lenses with a high added value can be produced without requiring large vacuum apparatus or gas release time during molding.

For example, when the preform is at the above-described temperature, it is effective to select a pressing rate of 0.5 mm/sec or less, more preferably 0.1 mm/sec or less.

Such a pressing rate may be employed till the atmosphere gas which is confined in a closed space is released. Thus, the pressing rate can be increased once the pressing has been carried out through the height of the closed space and the glass materials has come into intimate contact with the vicinity of the center of the molding surface of the mold. This is desired from the standpoint of shortening the molding cycle time.

Further, prior to feeding the preform onto the lower mold, the preform may be heated to a prescribed temperature. Pressing may be started immediately after feeding, or after the preform is additionally heated inside the mold. Furthermore, the manufacturing process was explained hereinabove with reference to a precision mold pressing of glass, but the present invention can be almost similarly applied to compression molding of resins.

As described hereinabove, the objective lens in accordance with the present invention makes it possible to ensure sufficient recording and reproduction performance in the objective lens for high-density recording medium with a numerical aperture NA of 0.8 or more. Moreover, confined atmosphere gas can be released during pressing and a lens with a high surface accuracy can be molded even when a closed space is formed between the molding material and the molding surface of the mold when molding is conducted by a mold press molding process. Further, in the lens in accordance with the present invention, R of the aspherical surface of the lens which is molded is not extremely small and the peripheral angle of the aspherical surface is not extremely large. Therefore, processing can be easily conducted as a stage of processing the molding surface of the mold.

The objective lens in accordance with the present invention is preferably the so-called core-less lens which does not require core removal after press molding. In such a case, determining the outer diameter of the lens during press molding, that is, making the preform volume equal to lens volume is advantageous to the present invention.

EXAMPLES

First to tenth working examples of the objective lens for recording and reproducing optical information, which follow the above-described embodiments of the present invention will be explained hereinbelow.

The aspherical surface in the explanation of the working examples hereinbelow can be represented by the following formula in which x stands for a distance in the optical axis direction from a contact plane to the spherical surface apex corresponding to a point on the aspherical surface which is at a height of y from the optical axis, R—a curvature radius of the surface, K—a conical constant, $A_{2i}$—an aspherical surface coefficient of the 2i-th order.

$$x = \frac{y^2/R}{1+\sqrt{1-(1+K)(y/R)^2}} + \sum_{i=2} A_{2i}y^{2i} \qquad \text{[Formula 1]}$$

Figure 4:
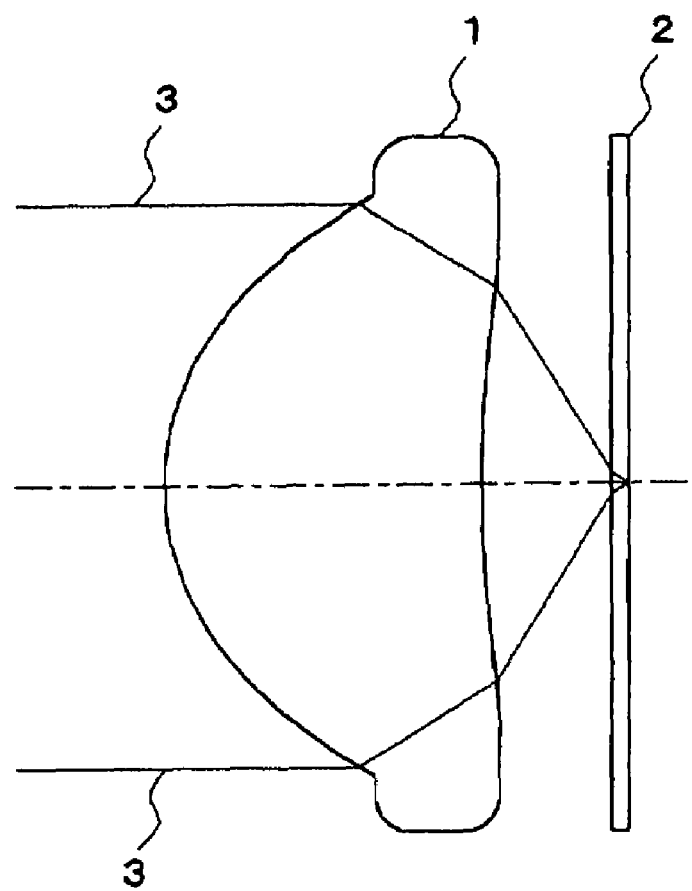
FIG. 4 is a drawing illustrating schematically the configuration of the objective lens optical system of the first working example of the present invention and an optical path in this optical system.
Figure 5:
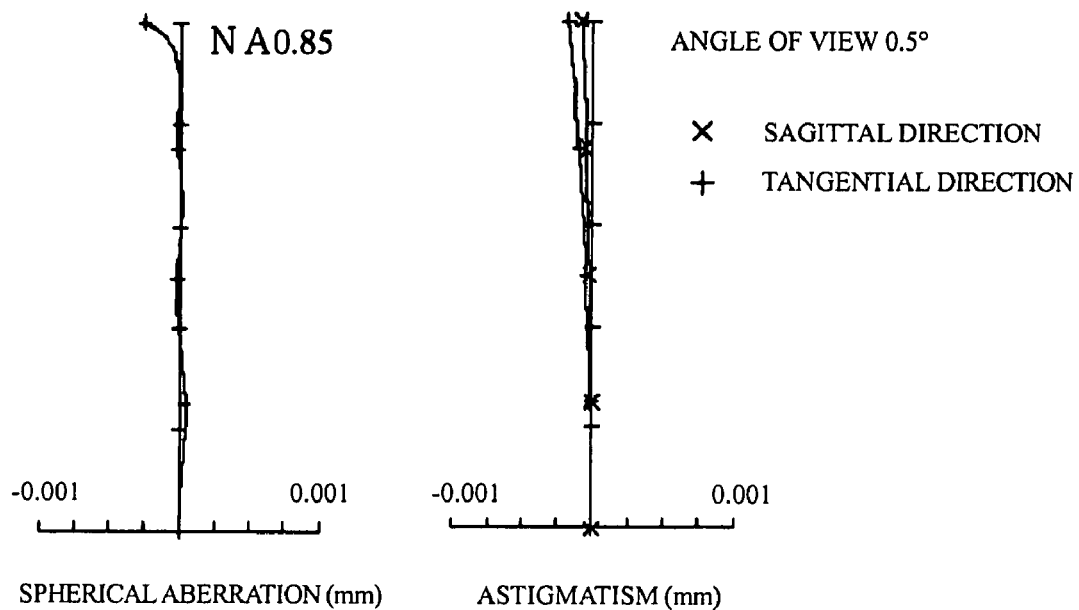
FIG. 5 illustrates spherical aberration and astigmatism in the objective lens shown in FIG. 4.
Figure 6:
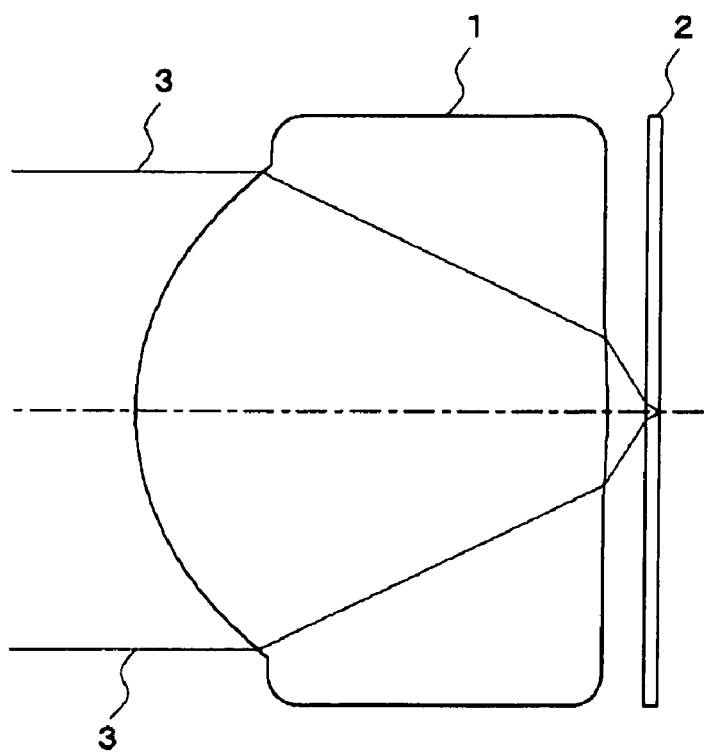
FIG. 6 is a drawing illustrating schematically the configuration of the objective lens optical system of the second working example of the present invention and an optical path in this optical system.
Figure 7:
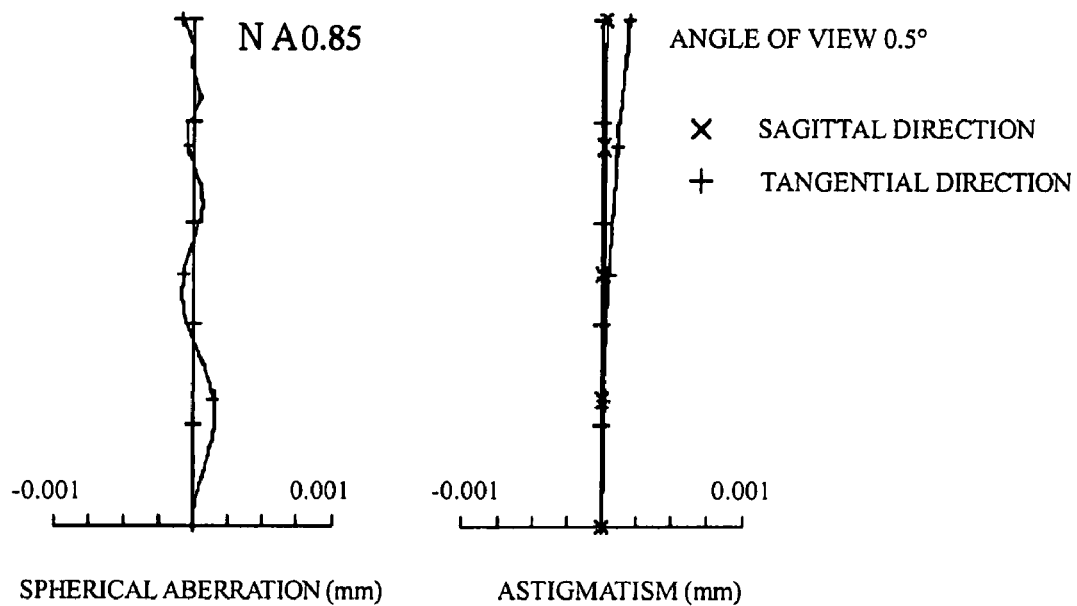
FIG. 7 illustrates spherical aberration and astigmatism in the objective lens shown in FIG. 6.

FIG. 4 illustrates the configuration of the objective lens optical system of the first working example and an optical path in this optical system. FIG. 5 illustrates spherical aberration and astigmatism in the first working example shown in FIG. 4. FIG. 6 illustrates the configuration of the objective lens optical system of the second working example of the present invention and an optical path in this optical system. FIG. 7 illustrates spherical aberration and astigmatism in the second working example shown in FIG. 6.

To facilitate understanding, in FIG. 4 and FIG. 6, reference symbols assigned to components are common with those in FIG. 1 and common reference symbols are also used in the third to tenth working examples described hereinbelow, but the shape of the objective lens 1 is different in each working example, as shown in Tables 1 to 5. Further, in the first to tenth working examples, the reference numeral 1 stands for an objective lens, 2—a cover glass, and 3—a luminous flux.

Table 1 shows data relating to the first and second working examples. The following numerical values are common for the first and second working examples:

Wavelength λ=407.5 nm,

Numerical aperture NA=0.85,

Refractive index of cover glass 2 (CG) n=1.62,

Abbe number of cover glass 2 (CG) vd=31.

TABLE 1

|  | Working Example | |
| --- | --- | --- |
|  | 1 | 2 |
| f (mm) | 1.765 | 1.765 |
| d (mm) | 1.7 | 3.0 |
| N | 1.83991 | 1.83991 |

TABLE 1-continued

|  |  | Working Example | |
|---|---|---|---|
|  |  | 1 | 2 |
| N d |  | 40.73 | 40.73 |
| Outer diameter (mm) R o |  | 3.7 | 3.7 |
| First | R (mm) | 1.34996 | 1.63921 |
| Surface | K | −0.72572 | −0.88854 |
|  | A4 | 1.65319E−02 | 1.42501E−02 |
|  | A6 | 3.55092E−03 | 3.12862E−03 |
|  | A8 | 1.14410E−04 | −2.15994E−03 |
|  | A10 | 3.70659E−04 | 1.77282E−03 |
|  | A12 | −1.77658E−04 | −5.80687E−04 |
|  | A14 | 7.82955E−05 | 1.44070E−05 |
|  | A16 | −3.79675E−05 | 9.70881E−06 |
|  | Effective diameter (mm) $R_E$ | 3.0 | 3.0 |
|  | Surface diameter (mm) | 3.1 | 3.1 |
| Second | R (mm) | 6.42935 | −2.55057 |
| surface | K | 0.27805 | −42.22949 |
|  | A4 | 8.85473E−03 | 1.41421E+00 |
|  | A6 | −1.92803E−02 | −1.15816E+01 |
|  | A8 | −2.56970E−03 | 4.89764E+01 |
|  | A10 | 8.35378E−03 | −1.06300E+02 |
|  | A12 | −2.82742E−03 | 9.23442E+01 |
|  | Effective diameter (mm) $R_E$ | 2.2 | 1.0 |
|  | Surface diameter (mm) | 2.61 | 1.2 |
| CG | d (mm) | 0.0875 | 0.0875 |
| Corner R c (mm) |  | 0.2 | 0.2 |
| Lens volume V (mm³) |  | 11.3 | 25.9 |
| Preform r (mm) |  | 1.39 | 1.83 |
| Preform r/Lens R |  | 1.03 | 1.12 |
| Axial wavefront aberration (λ rms) |  | 0.002 | 0.004 |
| Wavefront aberration at an angle of view of 0.5° (λ rms) |  | 0.066 | 0.022 |
| Axial wavefront aberration at a plane-parallel eccentricity of 2 μm (λ rms) |  | 0.020 | 0.015 |
| Chromatic aberration (μm/nm) |  | 0.60 | 0.42 |

In the first working example shown in FIG. 4, the first objective lens is a positive meniscus lens in which a convex aspherical surface is formed at the first surface on the side of a light source or a light-receiving unit and a concave aspherical surface is formed at the second surface on the side of an optical information recording medium. Table 1 and FIG. 5 clearly show that the aberrations such as wavefront aberrations, chromatic aberration, spherical aberration, and astigmatism are effectively corrected and good lens performance is obtained.

In the second working example shown in FIG. 6, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 1 and FIG. 7, the aberrations are effectively corrected and good lens performance is obtained.

Figure 8:
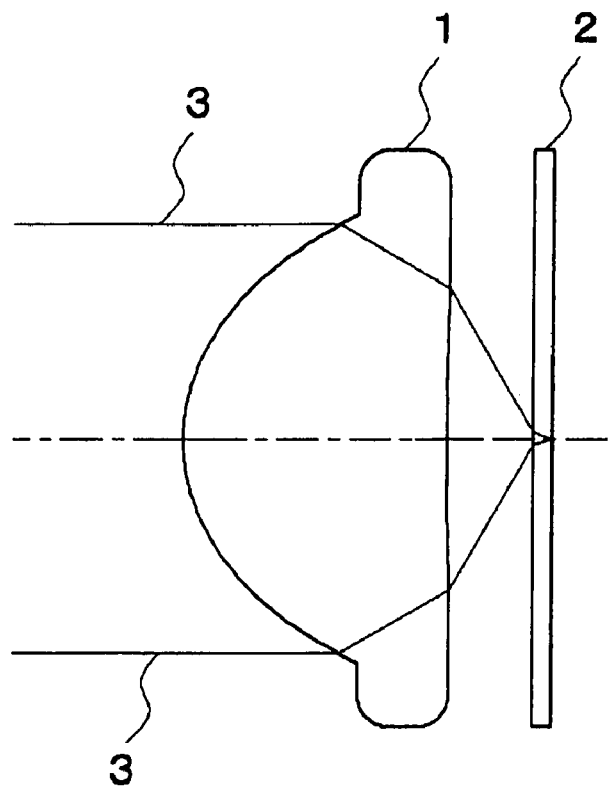
FIG. 8 is a drawing illustrating schematically the configuration of the objective lens optical system of the third working example of the present invention and an optical path in this optical system.
Figure 9:
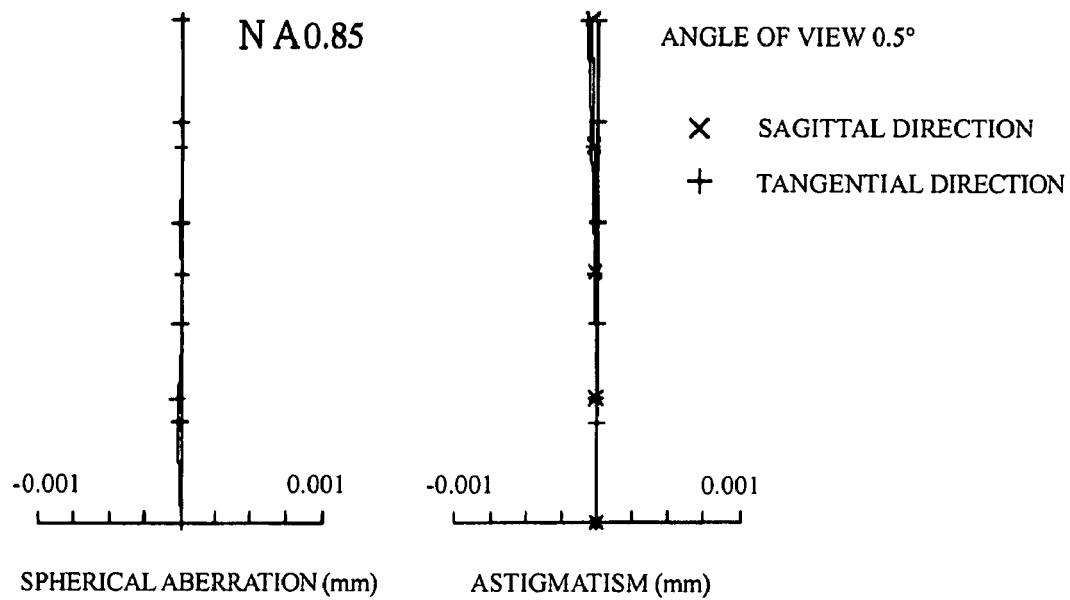
FIG. 9 illustrates spherical aberration and astigmatism in the objective lens shown in FIG. 8.
Figure 10:
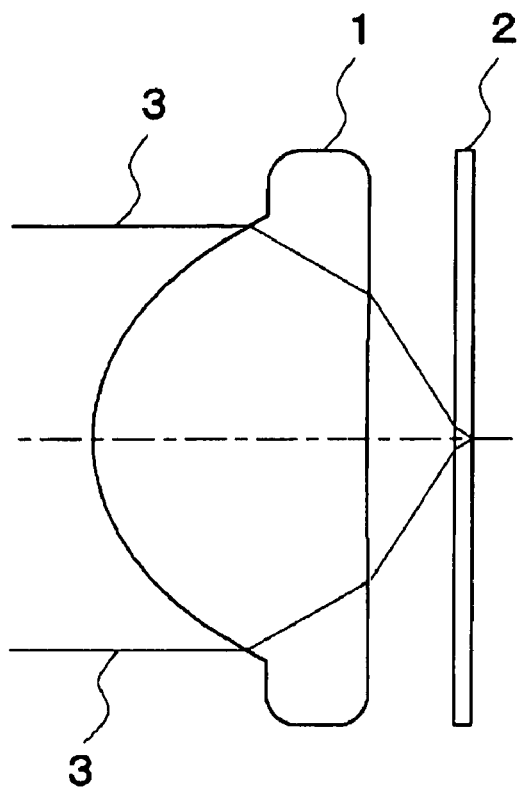
FIG. 10 is a drawing illustrating schematically the configuration of the objective lens optical system of the fourth working example of the present invention and an optical path in this optical system.
Figure 11:
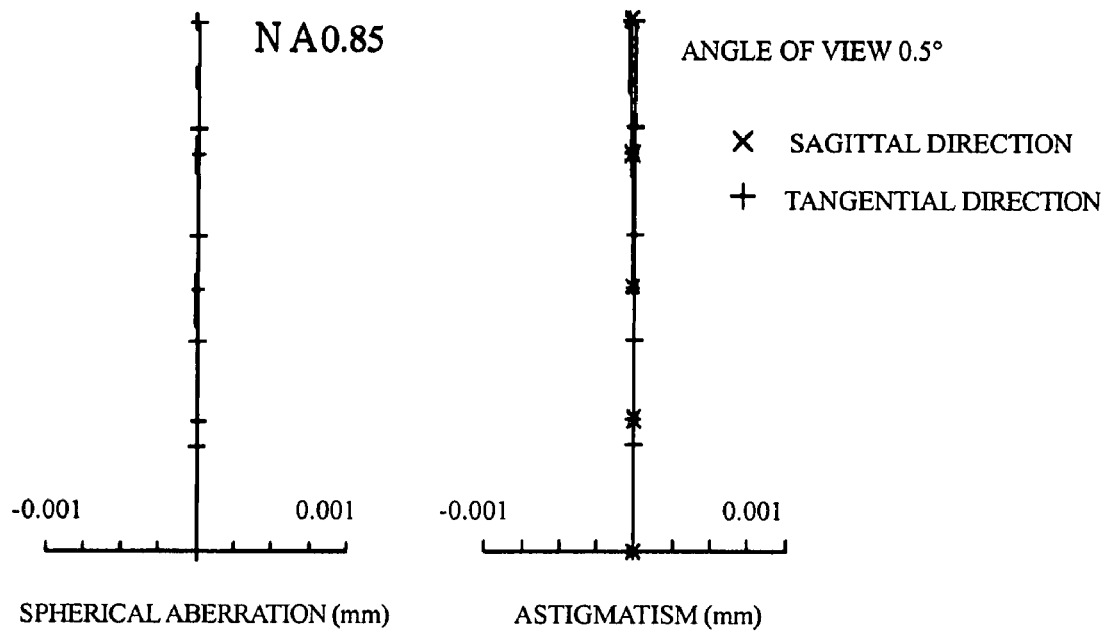
FIG. 11 illustrates spherical aberration and astigmatism in the objective lens shown in FIG. 10.

FIG. 8 illustrates the configuration of the objective lens optical system of the third working example and an optical path in this optical system. FIG. 9 illustrates spherical aberration and astigmatism in the third working example shown in FIG. 8. FIG. 10 illustrates the configuration of the objective lens optical system of the fourth working example and an optical path in this optical system. FIG. 11 illustrates spherical aberration and astigmatism in the fourth working example shown in FIG. 10. As has already been mentioned above, in FIG. 8 and FIG. 10, too, reference symbols assigned to components are common with those in FIG. 1 and common reference symbols are used to facilitate understanding. However, the shape of the objective lens 1 is different in each working example.

Table 2 shows data relating to the third and fourth working examples. The following numerical values are common for the third and fourth working examples:
Wavelength λ=407.5 nm,
Numerical aperture NA=0.85,
Refractive index of cover glass 2 (CG) n=1.62,
Abbe number of cover glass 2 (CG) νd=31.

TABLE 2

|  |  | Working Example | |
|---|---|---|---|
|  |  | 3 | 4 |
| f (mm) |  | 1.177 | 1.177 |
| d (mm) |  | 1.25 | 1.3 |
| n |  | 1.71504 | 1.71504 |
| ν d |  | 53.2 | 53.2 |
| Outer diameter (mm) R o |  | 2.7 | 2.7 |
| First | R(mm) | 0.85845 | 0.86586 |
| surface | K | −0.43770 | −0.47879 |
|  | A4 | 2.71643E−03 | 1.38249E−02 |
|  | A6 | −5.73119E−03 | −2.07543E−03 |
|  | A8 | 1.04332E−02 | 8.31353E−03 |
|  | A10 | −3.83260E−02 | −1.96745E−02 |
|  | A12 | 1.22058E−02 | 6.77846E−03 |
|  | A14 | 1.41147E−02 | 5.73530E−04 |
|  | A16 | −3.95804E−02 | −1.96777E−02 |
|  | Effective diameter (mm) $R_E$ | 2.0 | 2.0 |
|  | Surface diameter (mm) | 2.1 | 2.1 |
| Second | R (mm) | −16.67321 | −11.15503 |
| surface | K | 382.07129 | −3835.48604 |
|  | A4 | 4.19835E−01 | 3.24801E−01 |
|  | A6 | −1.37111E+00 | −1.23989E+00 |
|  | A8 | 2.44819E+00 | 2.41718E+00 |
|  | A10 | −2.42706E+00 | −2.59564E+00 |
|  | A12 | 1.08723E+00 | 1.18853E+00 |
|  | Effective diameter (mm) $R_E$ | 1.5 | 1.4 |
|  | Surface diameter (mm) | 1.562 | 1.6 |
| CG | d (mm) | 0.0875 | 0.0875 |
| Corner R c (mm) |  | 0.15 | 0.15 |
| Lens volume V (mm³) |  | 3.9 | 4.2 |
| Preform r (mm) |  | 0.98 | 1.00 |
| Preform r/Lens R |  | 1.14 | 1.16 |
| Axial wavefront aberration (λ rms) |  | 0.000 | 0.000 |
| Wavefront aberration at an angle of view of 0.5° (λ rms) |  | 0.040 | 0.040 |
| Axial wavefront aberration at a plane-parallel eccentricity of 2 μm (λ rms) |  | 0.023 | 0.022 |
| Chromatic aberration (μm/nm) |  | 0.28 | 0.28 |

In the third working example shown in FIG. 8, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 2 and FIG. 9, the aberrations such as wavefront aberrations, chromatic aberration, spherical aberration, and astigmatism are effectively corrected and good lens performance is obtained.

Further, in the fourth working example shown in FIG. 10, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 2 and FIG. 11, the aberrations are effectively corrected and good lens performance is obtained.

Figure 12:
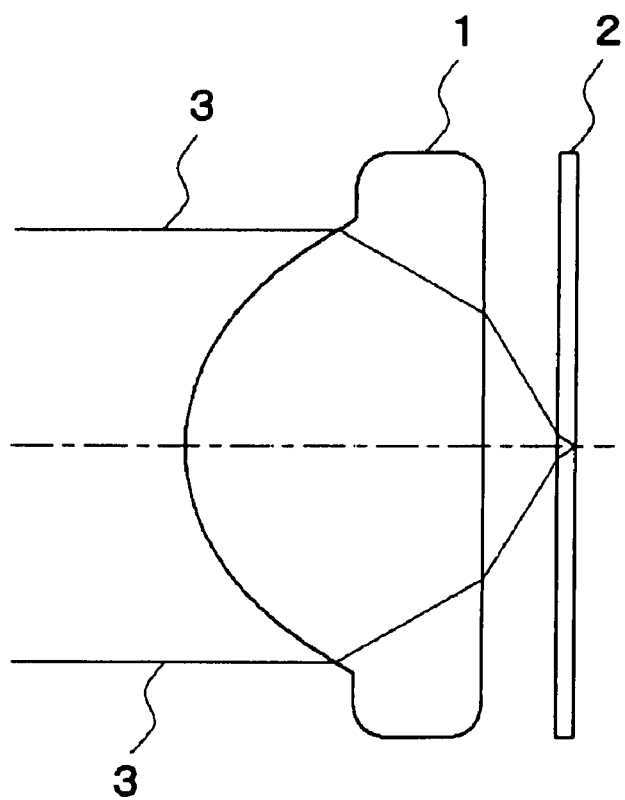
FIG. 12 is a drawing illustrating schematically the configuration of the objective lens optical system of the fifth working example of the present invention and an optical path in this optical system.
Figure 13:
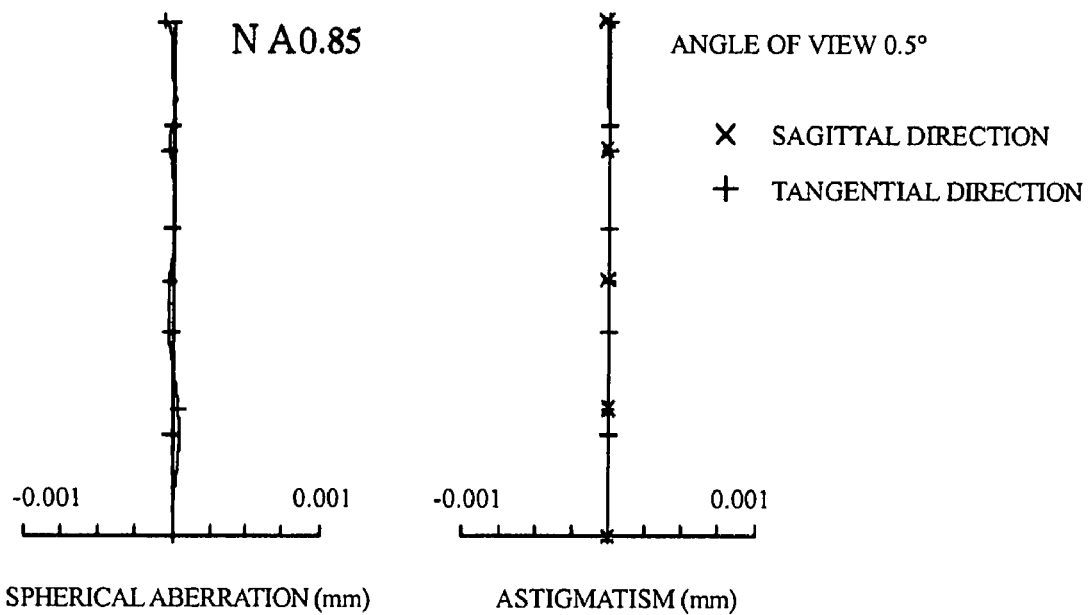
FIG. 13 illustrates spherical aberration and astigmatism in the objective lens shown in FIG. 12.
Figure 14:
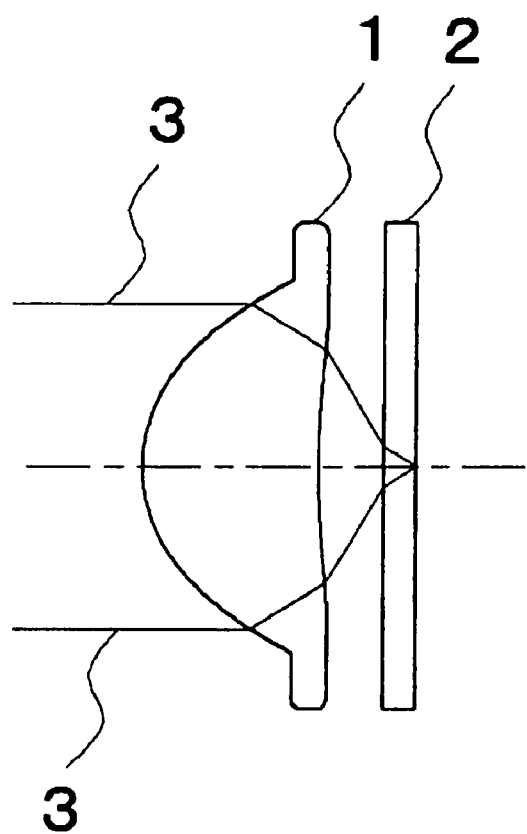
FIG. 14 is a drawing illustrating schematically the configuration of the objective lens optical system of the sixth working example of the present invention and an optical path in this optical system.
Figure 15:
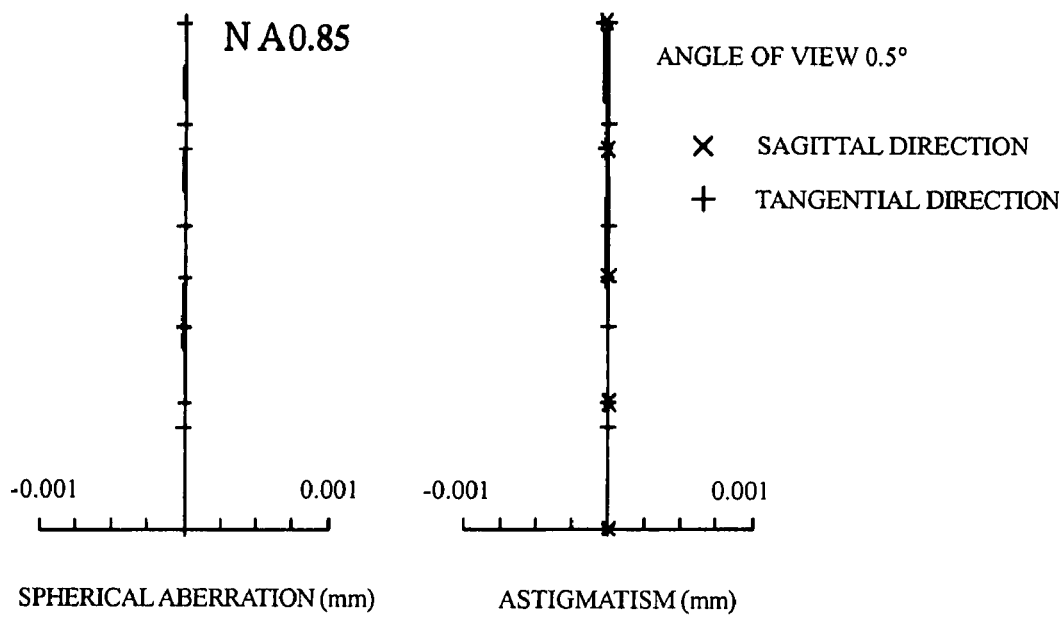
FIG. 15 illustrates spherical aberration and astigmatism in the objective lens shown in FIG. 14.

FIG. 12 illustrates the configuration of the objective lens optical system of the fifth working example and an optical path in this optical system. FIG. 13 illustrates spherical aberration and astigmatism in the fifth working example shown in FIG. 12. FIG. 14 illustrates the configuration of the objective lens optical system of the sixth working example and an optical path in this optical system. FIG. 15 illustrates spherical aberration and astigmatism in the sixth working example shown in FIG. 14. As has already been mentioned above, in FIG. 12 and FIG. 14, too, reference symbols assigned to components are common with those in FIG. 1 and common reference symbols are used to facilitate understanding. However, the shape of the objective lens 1 is different in each working example.

Table 3 shows data relating to the fifth and sixth working examples. The following numerical values are common for the fifth and sixth working examples:

Wavelength $\lambda$=407.5 nm,

Numerical aperture NA=0.85,

Refractive index of cover glass 2 (CG) n=1.62,

Abbe number of cover glass 2 (CG) $\nu d$=31.

TABLE 3

| | | Working Example | |
|---|---|---|---|
| | | 5 | 6 |
| f (mm) | | 1.177 | 0.588 |
| d (mm) | | 1.4 | 0.55 |
| n | | 1.71504 | 1.83991 |
| $\nu$ d | | 53.2 | 40.73 |
| Outer diameter (mm) R o | | 2.7 | 1.5 |
| First | R(mm) | 0.88323 | 0.46204 |
| surface | K | −0.49345 | −0.57219 |
| | A4 | 2.06827E−02 | 2.77053E−01 |
| | A6 | −7.79092E−03 | 6.00121E−01 |
| | A8 | 1.35840E−02 | −3.43715E−01 |
| | A10 | −1.34238E−02 | 1.03343E+00 |
| | A12 | 1.39718E−03 | 2.40244E+01 |
| | A14 | −5.80317E−04 | −3.40795E+02 |
| | A16 | −1.43769E−02 | 5.66410E+02 |
| | Effective diameter (mm) $R_E$ | 2.0 | 1.0 |
| | Surface diameter (mm) | 2.0 | 1.15 |
| Second | R (mm) | −5.99808 | 3.27357 |
| surface | K | −1880.48429 | −285.50258 |
| | A4 | 3.14551E−01 | 2.68889E+00 |
| | A6 | −1.34276E+00 | −3.94972E+01 |
| | A8 | 2.65845E+00 | 2.90984E+02 |
| | A10 | −2.63674E+00 | −1.13570E+03 |
| | A12 | 9.41882E−01 | 1.85941E+03 |
| | Effective diameter (mm) $R_E$ | 1.3 | 0.8 |
| | Surface diameter (mm) | 1.5 | 0.85 |
| CG | d (mm) | 0.0875 | 0.1 |
| Corner R c (mm) | | 0.15 | 0.03 |
| Lens volume V (mm³) | | 4.8 | 0.44 |
| Preform r (mm) | | 1.05 | 0.47 |
| Preform r/Lens R | | 1.18 | 1.02 |
| Axial wavefront aberration ($\lambda$ rms) | | 0.002 | 0.000 |
| Wavefront aberration at an angle of view of 0.5° ($\lambda$ rms) | | 0.038 | 0.021 |
| Axial wavefront aberration at a plane-parallel eccentricity of 2 μm ($\lambda$ rms) | | 0.020 | 0.017 |
| Chromatic aberration (μm/nm) | | 0.27 | 0.20 |

In the fifth working example shown in FIG. 12, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 3 and FIG. 13, the aberrations are effectively corrected and good lens performance is obtained.

Further, in the sixth working example shown in FIG. 14, the objective lens 1 is a positive meniscus lens in which a convex aspherical surface is formed at the first surface on the side of a light source or a light-receiving unit and a concave aspherical surface facing an optical information recording medium with its concave surface is formed at the second surface on the side of the optical information recording medium. In this case, too, as shown in Table 3 and FIG. 15, the aberrations are effectively corrected and good lens performance is obtained.

Figure 16:
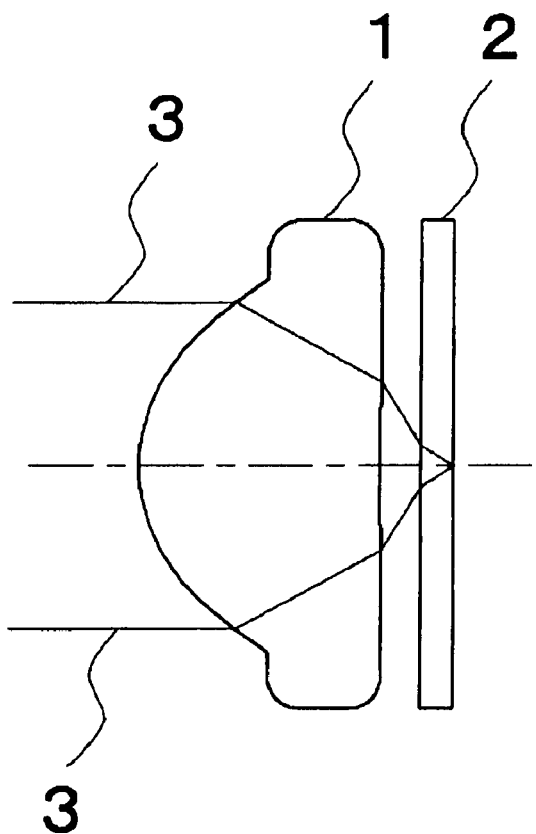
FIG. 16 is a drawing illustrating schematically the configuration of the objective lens optical system of the seventh working example of the present invention and an optical path in this optical system.
Figure 17:
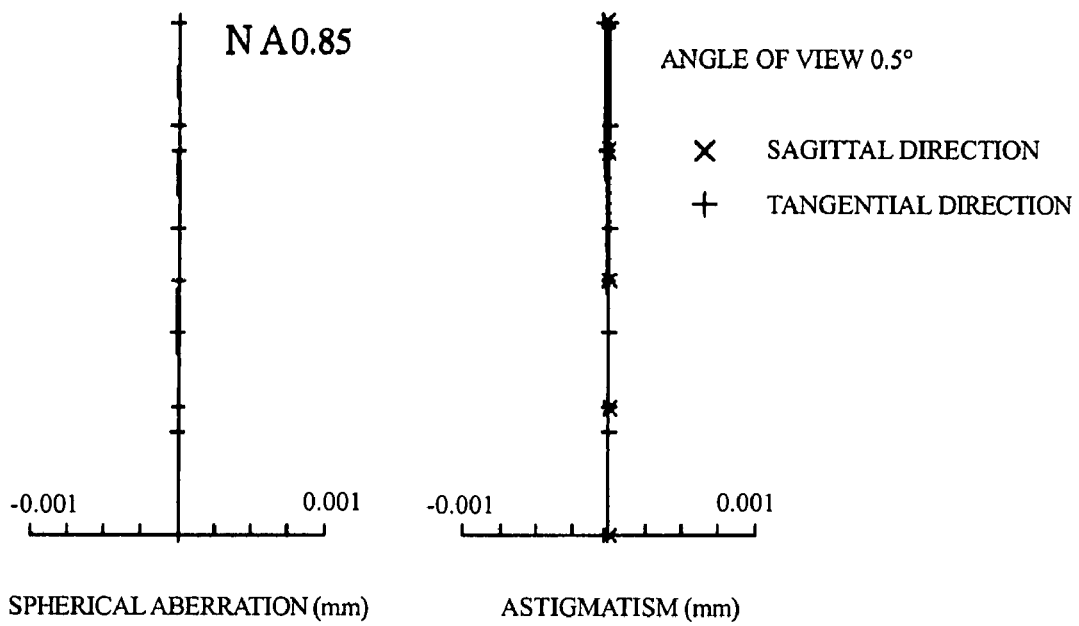
FIG. 17 illustrates spherical aberration and astigmatism in the objective lens shown in FIG. 16.
Figure 18:
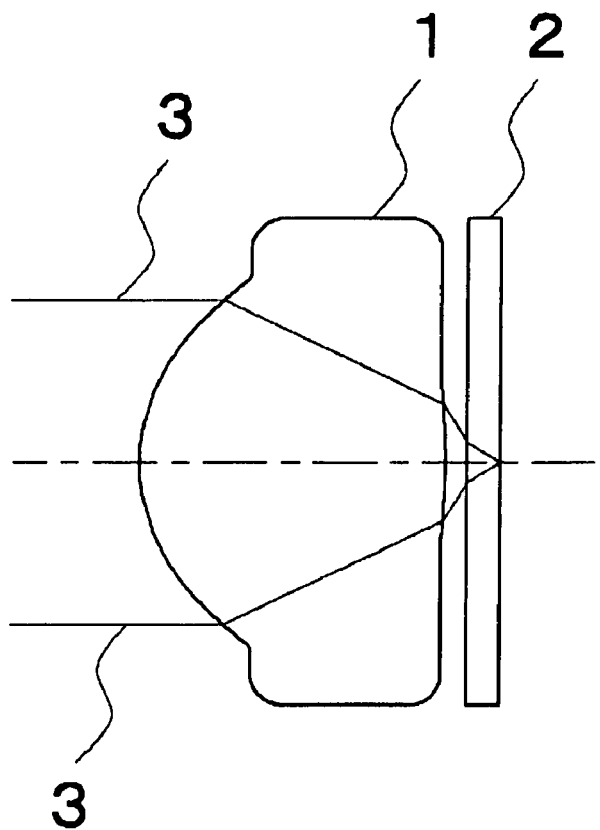
FIG. 18 is a drawing illustrating schematically the configuration of the objective lens optical system of the eighth working example of the present invention and an optical path in this optical system.
Figure 19:
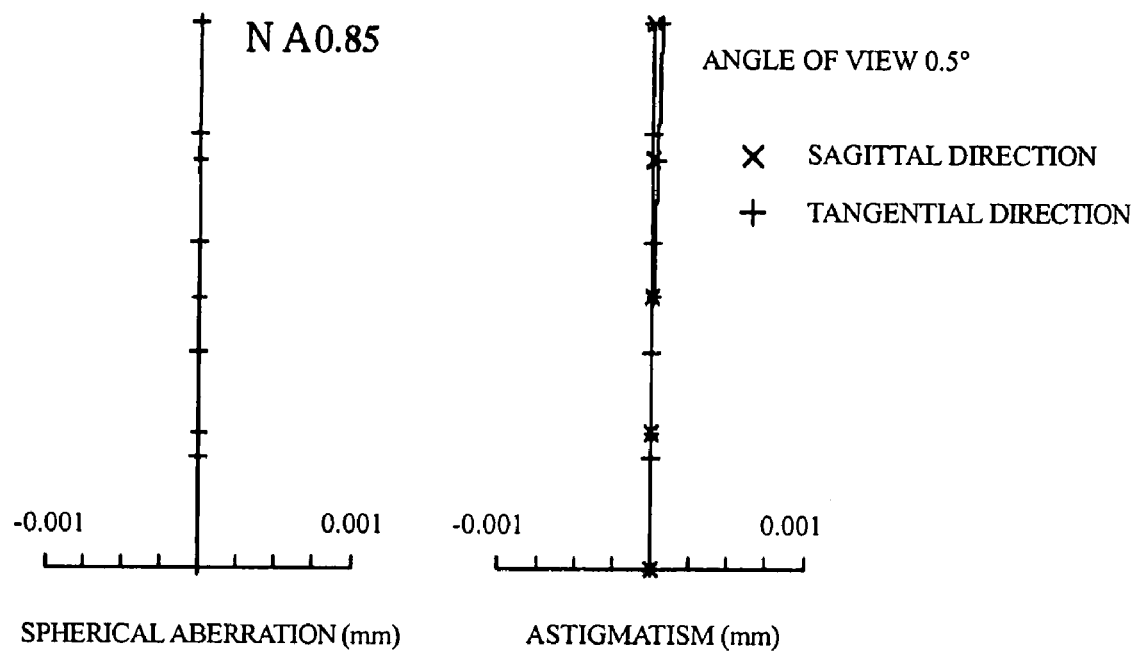
FIG. 19 illustrates spherical aberration and astigmatism in the objective lens shown in FIG. 18.

FIG. 16 illustrates the configuration of the objective lens optical system of the seventh working example and an optical path in this optical system. FIG. 17 illustrates spherical aberration and astigmatism in the seventh working example shown in FIG. 16. FIG. 18 illustrates the configuration of the objective lens optical system of the eighth working example and an optical path in this optical system. FIG. 19 illustrates spherical aberration and astigmatism in the eighth working example shown in FIG. 18. As has already been mentioned above, in FIG. 16 and FIG. 18, too, reference symbols assigned to components are common with those in FIG. 1 and common reference symbols are used to facilitate understanding. However, the shape of the objective lens 1 is different in each working example.

Table 4 shows data relating to the seventh and eighth working examples. The following numerical values are common for the seventh and eighth working examples:

Wavelength $\lambda$=407.5 nm,

Numerical aperture NA=0.85,

Refractive index of cover glass 2 (CG) n=1.62,

Abbe number of cover glass 2 (CG) $\nu d$=31.

TABLE 4

| | | Working Example | |
|---|---|---|---|
| | | 7 | 8 |
| f (mm) | | 0.588 | 0.588 |
| d (mm) | | 0.75 | 0.95 |
| N | | 1.83991 | 1.83991 |
| N d | | 40.73 | 40.73 |
| Outer diameter (mm) R o | | 1.5 | 1.5 |
| First | R(mm) | 0.50127 | 0.55551 |
| Surface | K | −0.58282 | −0.60018 |
| | A4 | 2.12415E−01 | 1.75957E−01 |
| | A6 | 4.32800E−01 | 2.55080E−01 |
| | A8 | −1.66207E+00 | −1.39432E+00 |
| | A10 | 2.12004E+01 | 2.01205E+01 |
| | A12 | −1.34791E+02 | −1.45960E+02 |
| | A14 | 3.91953E+02 | 5.31854E+02 |
| | A16 | −6.22915E+02 | −8.85589E+02 |
| | Effective diameter (mm) $R_E$ | 1.0 | 1.0 |
| | Surface diameter (mm) | 1.15 | 1.15 |
| Second | R (mm) | −10.6053 | −0.97615 |
| Surface | K | 1293.70381 | −147.24370 |
| | A4 | 5.22824E+00 | 5.72506E+00 |
| | A6 | −1.24761E+02 | −1.61246E+02 |
| | A8 | 1.69999E+03 | 5.92920E+02 |
| | A10 | −1.31926E+04 | 2.59250E+04 |

TABLE 4-continued

| | | Working Example | |
|---|---|---|---|
| | | 7 | 8 |
| | A12 | 4.72334E+04 | −2.66508E+05 |
| | Effective diameter (mm) $R_E$ | 0.53 | 0.4 |
| | Surface diameter (mm) | 0.58 | 0.45 |
| CG | d (mm) | 0.1 | 0.1 |
| Corner R c (mm) | | 0.1 | 0.1 |
| Lens volume V (mm³) | | 0.81 | 1.2 |
| Preform r (mm) | | 0.58 | 0.66 |
| Preform r/Lens R | | 1.15 | 1.19 |
| Axial wavefront aberration (λ rms) | | 0.001 | 0.000 |
| Wavefront aberration at an angle of view of 0.5° (λ rms) | | 0.013 | 0.004 |
| Axial wavefront aberration at a plane-parallel eccentricity of 2 μm (λ rms) | | 0.017 | 0.017 |
| Chromatic aberration (μm/nm) | | 0.17 | 0.14 |

In the seventh working example shown in FIG. 16, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 4 and FIG. 17, the aberrations are effectively corrected and good lens performance is obtained.

Further, in the eighth working example shown in FIG. 18, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 4 and FIG. 19, the aberrations are effectively corrected and good lens performance is obtained.

Figure 20:
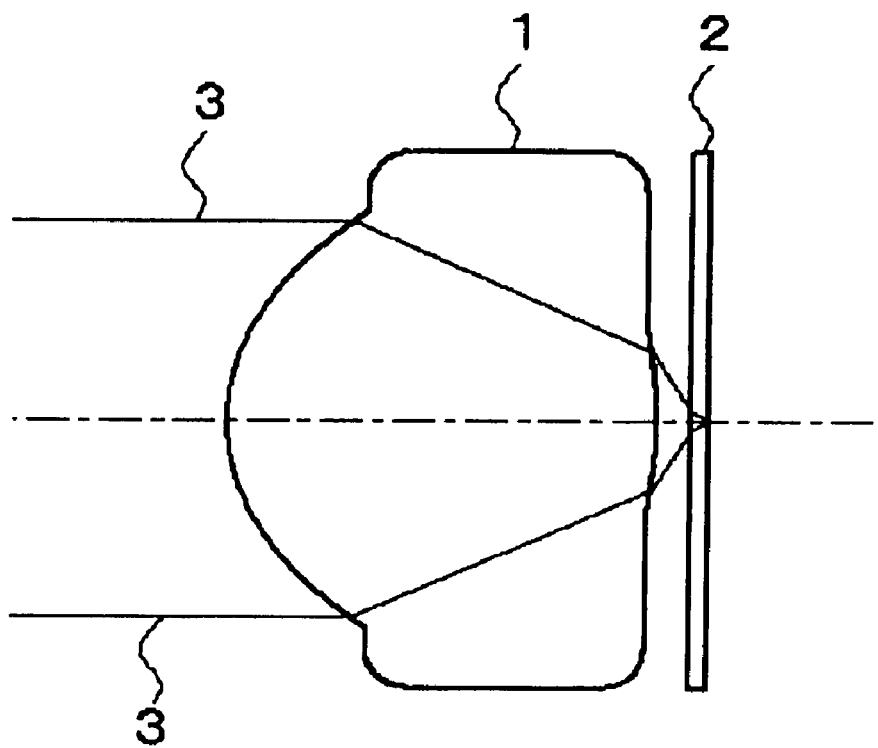
FIG. 20 is a drawing illustrating schematically the configuration of the objective lens optical system of the ninth working example of the present invention and an optical path in this optical system.
Figure 21:
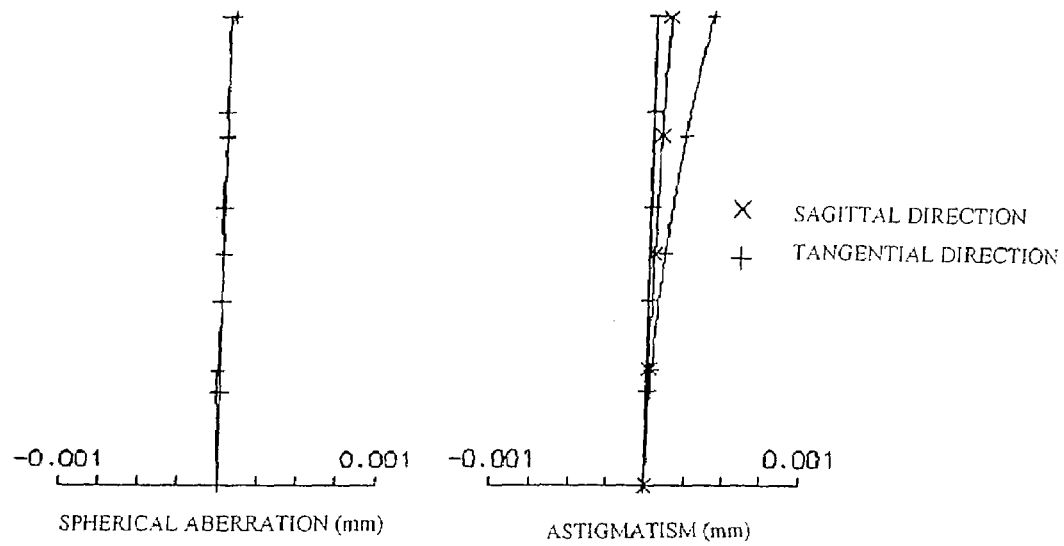
FIG. 21 illustrates spherical aberration and astigmatism in the objective lens shown in FIG. 20.
Figure 22:
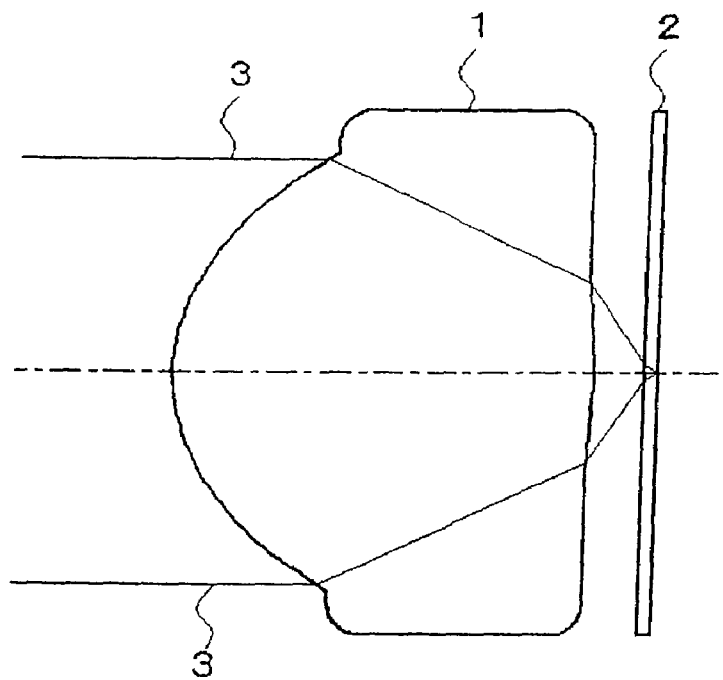
FIG. 22 is a drawing illustrating schematically the configuration of the objective lens optical system of the tenth working example of the present invention and an optical path in this optical system.
Figure 23:
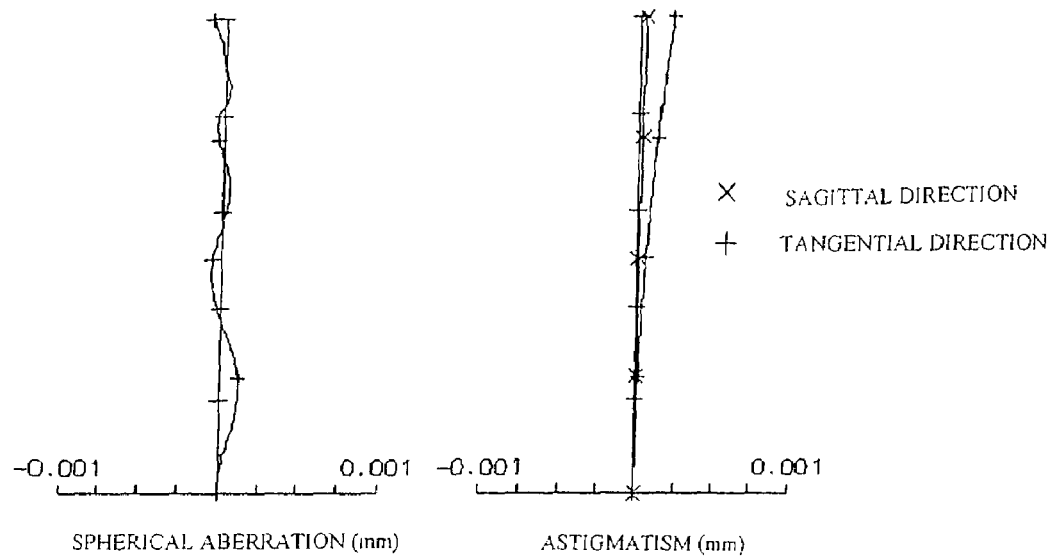
FIG. 23 illustrates aspherical aberration and astigmatism in the objective lens shown in FIG. 22.

FIG. 20 illustrates the configuration of the objective lens optical system of the ninth working example and an optical path in this optical system. FIG. 21 illustrates spherical aberration and astigmatism in the ninth working example shown in FIG. 21. FIG. 22 illustrates the configuration of the objective lens optical system of the tenth working example and an optical path in this optical system. FIG. 23 illustrates spherical aberration and astigmatism in the tenth working example shown in FIG. 22. As has already been mentioned above, in FIG. 20 and FIG. 22, too, reference symbols assigned to components are common with those in FIG. 1 and common reference symbols are used to facilitate understanding. However, the shape of the objective lens 1 is different in each working example.

Table 5 shows data relating to the ninth and tenth working examples. The following numerical values are common for the ninth and tenth working examples:

Wavelength λ=407.5 nm

Numerical aperture NA=0.85

Refractive index of cover glass 2 (CG) n=1.62,

Abbe number of cover glass 2 (CG) νd=31.

TABLE 5

| | | Working Example | |
|---|---|---|---|
| | | 9 | 10 |
| f (mm) | | 1.176 | 1.765 |
| d (mm) | | 2.0 | 2.7 |
| n | | 1.71504 | 1.71504 |
| ν d | | 53.2 | 53.2 |
| Outer diameter (mm) R o | | 2.7 | 3.7 |
| First surface | R(mm) | 1.01159 | 1.43413 |
| | K | −0.50802 | −0.94008 |
| | A4 | 1.49700E−02 | 2.22337E−02 |
| | A6 | −1.56373E−03 | 4.17484E−03 |
| | A8 | 1.05909E−02 | −1.46299E−03 |
| | A10 | −1.97035E−02 | 1.36769E−03 |
| | A12 | 6.72654E−03 | −4.33880E−04 |
| | A14 | 9.38731E−03 | 3.40392E−05 |
| | A16 | −1.27879E−02 | −1.32607E−05 |
| | Effective diameter (mm) $R_E$ | 2.0 | 3.0 |
| | Surface diameter (mm) | 2.1 | 3.1 |
| Second surface | R (mm) | −0.87763 | −2.25887 |
| | K | −65.41056 | −94.43297 |
| | A4 | 5.96369E−01 | 3.89491E−01 |
| | A6 | −6.34510E+00 | −1.84241E+00 |
| | A8 | 1.77795E+01 | 4.20190E+00 |
| | A10 | 5.16701E+01 | −4.94239E+00 |
| | A12 | −2.97205E+02 | 2.34865E+00 |
| | Effective diameter (mm) $R_E$ | 0.75 | 1.30 |
| | Surface diameter (mm) | 0.90 | 1.45 |
| CG | d (mm) | 0.0875 | 0.0875 |
| Corner R c (mm) | | 0.2 | 0.2 |
| Lens volume V (mm³) | | 29.8 | 75.5 |
| Preform r (mm) | | 1.27 | 1.72 |
| Preform r/Lens R | | 1.25 | 1.20 |
| Axial wavefront aberration (λ rms) | | 0.001 | 0.003 |
| Wavefront aberration at an angle of view of 0.5° (λ rms) | | 0.026 | 0.026 |
| Axial wavefront aberration at a plane-parallel eccentricity of 2 μm (λ rms) | | 0.015 | 0.020 |
| Chromatic aberration (μm/nm) | | | |
| Corner R c (mm) | | 0.20 | 0.34 |

In the ninth working example shown in FIG. 20, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 5 and FIG. 21, the aberrations are effectively corrected and good lens performance is obtained.

Further, in the tenth working example shown in FIG. 22, the objective lens 1 is a biconvex lens in which a convex aspherical surface is formed at the first surface on the side of a light source or a light-receiving unit and a convex aspherical surface facing an optical information recording medium with its convex surface is formed at the second surface on the side of the optical information recording medium. In this case, too, as shown in Table 5 and FIG. 23, the aberrations are effectively corrected and good lens performance is obtained.

It goes without saying that the present invention is not limited to the above-described working examples. For example, if a large axial wavefront aberration at a plane-parallel eccentricity of 2 μm (λrms) is designed, that is, if a strict plane-parallel eccentricity tolerance can be obtained, then the off-axis aberration can be improved.

What is claimed is:

1. An objective lens device of a single-lens construction, comprising:

an objective lens element having a convex aspherical surface forming a first surface upon which light from a light source is incident;

the objective lens element having a numerical aperture NA of at least 0.8;

the objective lens element having an off-axis wavefront aberration at an angle of view of 0.5° and a standard wavelength λ which is equal to or less than 0.07 λrms;

the first surface having an effective surface diameter of a radius $R_E$ (mm);

the objective lens element having an outer diameter a radius $R_O$ (mm) and which is greater than said effective surface diameter of said first surface;

the radius $R_O$ (mm) of the outer diameter and the radius $R_E$ (mm) of the effective surface diameter of the first surface satisfying the relationship $$0.2 \leq (R_O - R_E) \leq 0.6.$$

2. The objective lens device of claim 1, wherein the objective lens element has a volume V, R represents a paraxial curvature radius of the convex aspherical surface, and a numeric value r satisfies first equation $$(4/3)\pi r^3 = V,$$

and also satisfies a second equation $$1.0 \leq r/R \leq 1.35.$$

3. The objective lens device of claim 2, wherein the volume V is 0.3-25 mm³.

4. The objective lens device of claim 1 or 2, wherein a focal distance f (mm) of the objective lens element satisfies a relationship:

$$0.5 \leq f \leq 2.1.$$

5. The objective lens device of claim 1 or 2, wherein the objective lens element is a press molded objective lens formed of an optical glass with a specific gravity of 2.20-4.70 g/cm³.

6. The objective lens device of claim 5, wherein the optical glass has a refractive index at a standard wavelength λ of 1.65 or more, an Abbe number νd of 40 or more, and a yield temperature Ts of 650° C. or less.

7. The objective lens device of claim 5, wherein a liquidus temperature of the optical glass is less than 1000° C.

* * * * *